United States Patent [19]

Rapata et al.

[11] Patent Number: 4,653,968
[45] Date of Patent: Mar. 31, 1987

[54] ADJUSTABLE ABUTMENT ASSEMBLY

[75] Inventors: George M. Rapata, Schaumburg; Jeffrey C. Albrecht, Chicago Heights, both of Ill.

[73] Assignee: Illinois Tool Works, Inc., Chicago, Ill.

[21] Appl. No.: 180,766

[22] Filed: Aug. 25, 1980

[51] Int. Cl.$^4$ .................. F16B 39/30; F16M 11/04; B62D 25/12; E04G 25/08

[52] U.S. Cl. .................. 411/247; 180/69.2; 180/313; 296/76; 403/343; 411/255; 411/301; 16/19; 248/188.4; 248/354.6

[58] Field of Search .............. 180/69 C, 69 R; 16/86 A, 86 R, 19; 296/76; 411/81, 259, 166, 366, 167, 272, 168, 273, 176, 301, 184, 305, 185, 186, 190, 187, 188, 189, 308, 309, 310, 311; 29/428; 248/405, 406, 188.4; 403/343, 342

[56] References Cited

U.S. PATENT DOCUMENTS

| | | | |
|---|---|---|---|
| 2,355,486 | 8/1944 | Tinnerman | 411/272 |
| 2,601,651 | 6/1952 | Wandy | 411/306 |
| 3,274,638 | 9/1966 | Bien | 16/86 A |
| 3,336,962 | 8/1967 | Foote, Jr. et al. | 411/272 |
| 3,843,984 | 10/1974 | Bagheri et al. | 411/306 X |
| 4,186,476 | 2/1980 | Mair et al. | 180/69 C X |

FOREIGN PATENT DOCUMENTS 816562  7/1959  United Kingdom ............... 411/301

Primary Examiner—Joseph F. Peters, Jr.
Attorney, Agent, or Firm—J. P. O'Brien; T. W. Buckman

[57] ABSTRACT

A hood bumper assembly which may be used, for example, to adjustably align the hood of an automobile with the adjacent fenders as the hood is brought down into locked engagement over the engine compartment. The assembly includes a workpiece, which may be the framework of the engine compartment, having an aperture and a helical internal marginal portion defined around the aperture, and a member having an end with a spherical surface portion arranged to engage the hood when closed and a shank portion including a helical thread adapted to be threadingly received by the aperture. The assembly further includes detent means carried by the shank and the workpiece for releasably locking the shank within the aperture against rotation at predetermined rotational intervals. The spherical surface portion of the member end is arranged to coact with a stamped recess in the underside of the hood to prevent lateral vibration of the hood and to positively locate the hood in proper position when it is closed.

20 Claims, 12 Drawing Figures

ADJUSTABLE ABUTMENT ASSEMBLY

BACKGROUND OF THE INVENTION

The present invention relates to adjustable abutment assemblies and more particularly to a hood bumper assembly arranged to adjustably engage the hood of an automobile as it is brought down into a locked position over the automobile engine compartment.

Adjustable abutments are used in many environments, as for example, in the form of hood bumper assemblies. Such assemblies are usually provided in the engine compartment of an automobile and include an abutment member arranged to engage the hood when the hood is brought down to a locked position. In the usual case, at least two abutment members are provided at respective sides of the engine compartment to vertically align the hood with the automobile fenders when the hood is closed.

Abutment assemblies of the prior art for such use have included a workpiece, which may for example be the frame of the engine compartment, having an aperture formed therein which is coined or otherwise deformed to define a helical thread about the aperture. An abutment member having an enlarged end and a threaded shank portion extending from the enlarged end is arranged to be threadingly received by the aperture. The abutment member is rotated into the aperture by a sufficient number of revolutions so that the enlarged end is at a desired position to align the hood when closed. Also, indentations about the aperture have been provided in the engine compartment frame to enable the relatively thin sheet metal into which the aperture is formed to receive abutment members having relatively large threads.

Such prior art hood bumper assemblies exhibit the deficiency that, after numerous closings of the hood, the vibration caused by the closing of the hood can cause the threaded abutment member to rotate in the aperture and thus become misadjusted. As a result, after such numerous hood closings, the prior art abutment members do not properly align the hood with the adjacent fenders. Further, prior art abutment members have had a flat end surface for engaging the underside of the hood. Such flat engaging surfaces allow the hood to vibrate laterally during automobile movement and do not positively locate the hood in the proper lateral position upon being closed.

Therefore, there is a need in the art for a hood bumper assembly having an adjustable rotatable abutment member wherein, after being adjusted, rotation of the abutment member is precluded notwithstanding the vibrations caused by the closing of the automobile hood. There is a further need for a hood bumper assembly which includes an abutment member capable of preventing lateral hood vibration and positively locating the hood in its proper lateral position upon being closed.

It is therefore a general object of the present invention to provide a new and improved adjustable abutment assembly.

It is a more particular object of the present invention to provide a new and improved hood bumper assembly which, once adjusted, will not become misadjusted during closings of the automobile hood.

It is a still more particular object of the present invention to provide a new and improved hood bumper assembly of the type which includes an abutment member having a head with a spherical surface portion at one end arranged to engage the hood of an automobile when closed and arranged to coact with a stamped recess in the undersurface of the hood to prevent lateral vibration of the hood and to guide the hood into a proper lateral position upon each closure of the hood.

SUMMARY OF THE INVENTION

The invention therefore provides a hood bumper assembly comprising a workpiece including an aperture and a helical internal marginal portion defined around the aperture, a member having an end portion arranged to engage the hood when closed and a shank portion extending from the end portion including a helical thread for being threadingly received by the aperture, and detent means including first means carried by the shank portion and second means carried by the workpiece and arranged to cooperate with the first means for releasably locking the shank within the aperture against rotation at predetermined rotational intervals of the shank portion.

In a preferred form, the member end portion includes a spherical surface portion for coacting with a stamped recess in the underside of the hood to prevent lateral hood vibration and to provide repeated lateral alignment of the hood upon each closure thereof.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements and wherein:

DESCRIPTION OF THE PREFERRED EMBODIMENT

Figure 1:
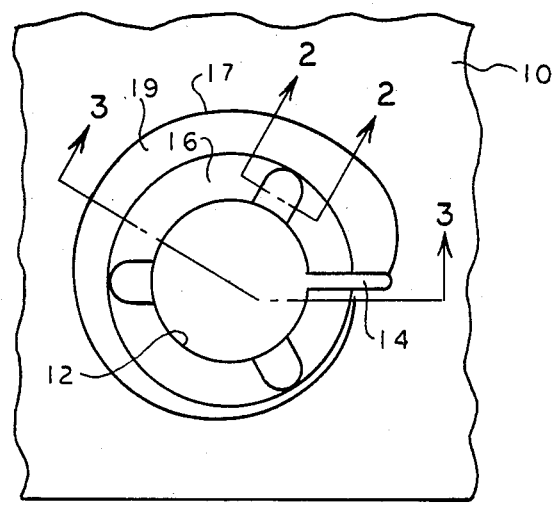
FIG. 1 is a top plan view of a workpiece having an aperture formed therein in accordance with a preferred embodiment of the present invention.
Figure 3:
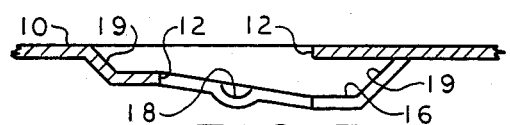
FIG. 3 is a cross-sectional view taken along lines 3—3 of FIG. 1.

Referring now to FIG. 1, a workpiece 10, which may be the framework of an automobile engine compartment, has an aperture 12 formed therein. A radial slot 14 extends radially outwardly from the aperture 12 and permits coining or deforming of the workpiece 10 about the aperture 12 to provide a depression having a helical internal marginal portion 16 around the aperture 12 and define a juncture line 17 between the sidewall 19 of the depression and the top surface of the workpiece. The helical internal marginal portion 16 preferably defines a single turn helical thread which is illustrated in cross section in FIG. 3.

Figure 2:
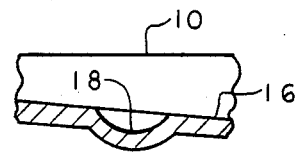
FIG. 2 is a partial cross-sectional view taken along lines 2—2 of FIG. 1.

Within the marginal portion 16 a plurality of indentations 18 are formed on the surface of the workpiece 10. Preferably, the indentations 18 are formed simultaneously with the formation of the marginal portion 16. Also, as may be preferable, the aperture 12, radial slot 14, marginal portion 16, and indentations 18 may be simultaneously formed during the same machine operation. One such indentation 18 is shown in cross section in FIG. 2.

As will be described subsequently, the indentations 18 constitute a second plurality of means located at predetermined circumferentially spaced intervals which forms detent means to releasably lock the abutment member of FIG. 4 within the aperture 12 against rotation at predetermined rotational intervals. The indentations 18 further adapt the relatively thin sheet metal material of the workpiece 10 to securely receive abutment members having helical threads of various pitches.

Figure 4:
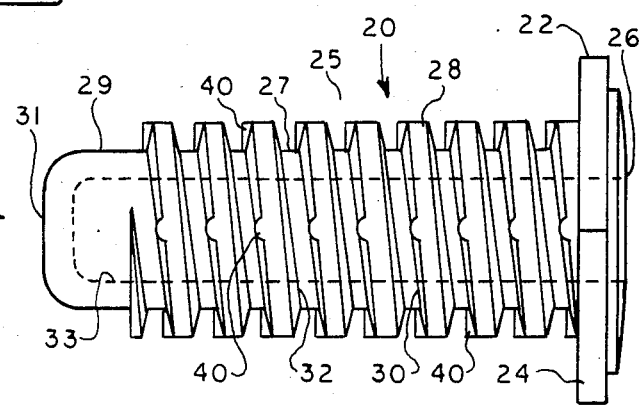
FIG. 4 is a side plan view of an abutment member constructed in accordance with a preferred embodiment of the present invention and which is adapted to be threadingly received by the aperture illustrated in FIG. 1.

Referring now to FIG. 4, it illustrates an abutment member 20 which may be utilized in conjunction with the aperture 12 of FIG. 1 in practicing the present invention in accordance with this first embodiment. The abutment member 20 includes an enlarged end portion 22 having a hexagonal head 24 and a central raised generally spherical surface portion 26 arranged to engage the undersurface of the hood of an automobile when closed. Extending from the end portion 22 is a shank portion 25 which includes a root 27. Upon the root 27 there is formed a helical thread 28 having a plurality of leading flanks 30 and a plurality of trailing flanks 32.

Figure 5:
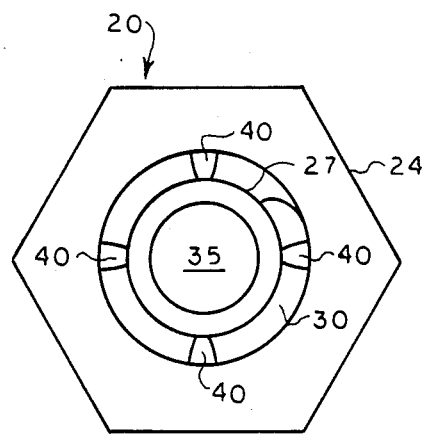
FIG. 5 is a partial cross-sectional view of the abutment member of FIG. 4 while illustrating a modified end construction thereof.

The abutment member 20 also includes a nose portion 29 which is an extension of the shank 25 and having a diameter equal to the diameter of the root 27. The nose portion 29 in this embodiment has a closed end 31 but also may have an open end as illustrated in FIG. 5. The nose portion 29 is provided to lead the member 20 into the helical impression and aperture 12 of the workpiece 10.

The abutment member 20 is preferably formed by a molding operation and is formed from a material having an elastomeric characteristic such as, for example, DuPont Hytrel 5555-HS material. Such molding is advantageous to provide a blind bore 33 with the closed end 31 (FIG. 4), or a through bore 35 (FIG. 5). Such constructions provide an abutment member 20 having desirable elastomeric characteristics as will be described hereafter, and provides a member which is light in weight. However, the member 20 may also be solid as well without departing from the present invention.

Figure 6:
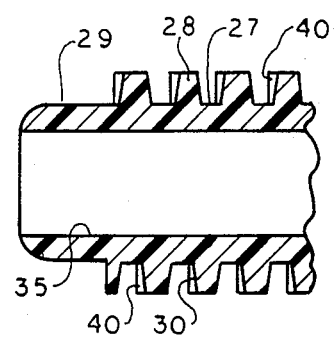
FIG. 6 is an end plan view of the abutment member of FIG. 5.

As can be clearly seen in FIGS. 4, 5 and 6, the leading flanks 30 of the helical thread 28 are provided with a plurality of ribs 40 which are carried by the flanks 30 and extend radially outwardly from the root 27 of the shank portion 25. Preferably, at least two such ribs are provided for each turn of the helical thread and are unequal in number to the number of indentations 18 formed about the aperture 12. In this preferred embodiment, four such ribs 40 are provided for each turn of the helical thread and, three indentations 18 are provided about the aperture 12 in workpiece 10. The ribs 40 constitute a first plurality of means separated at predetermined circumferentially spaced intervals which form the previously referred to detent means to releasably lock the abutment member 20 against rotation in a manner to be described hereinafter.

In FIGS. 4, 5, and 6 it can be seen that the ribs 40 extend from the crest of the thread 28 to the root 27. The ribs could however just as well terminate tangent to the root 27 or just short of the root. In either of these alternative constructions, the assembly will function in accordance with the principles of the present invention.

Figure 7:
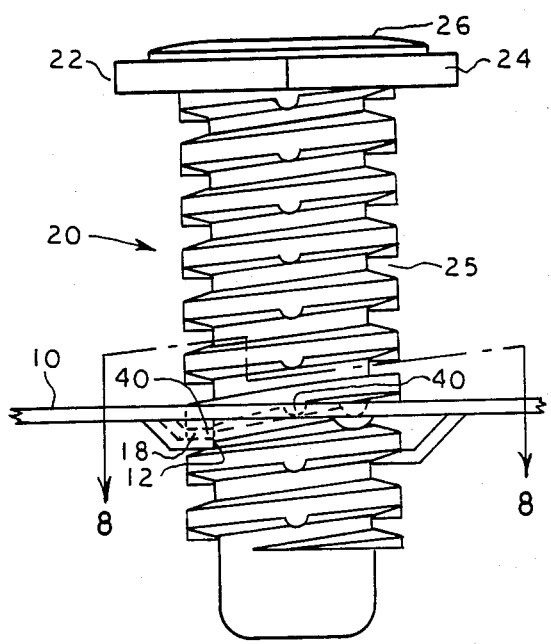
FIG. 7 is a side plan view illustrating the operation of the hood bumper assembly of the present invention with the abutment member of FIG. 4 threadingly received within the aperture of FIG. 1.
Figure 8:
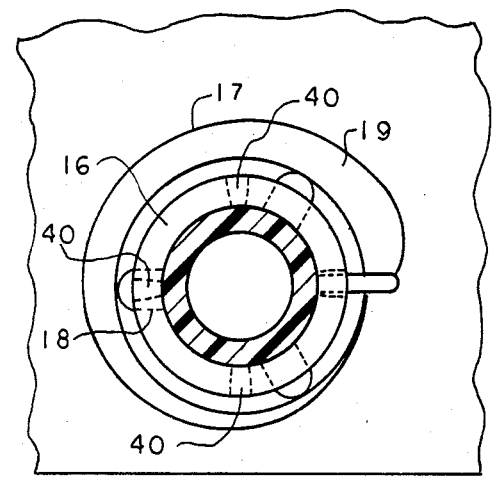
FIG. 8 is a cross-sectional view taken along lines 8—8 of FIG. 7.

Referring now to FIGS. 7 and 8, it can there be seen that the threaded shank portion 25 of the abutment member 20 is threadingly received within the aperture 12 of the workpiece 10. The abutment member 20 has been rotated within the aperture 12 so that the head portion 22 is at a desired height above the workpiece 10 to properly position the spherical surface portion 26 for engaging the undersurface of a hood when closed in a locked position over its engine compartment to align the hood with an adjacent fender. It will be noted in FIGS. 7 and 8 that one of the ribs 40 is engaged within one of the indentations 18 formed within the marginal portion 16 while the other ribs 40 are firmly engaged against the top surface of the workpiece 10. Thus, it can be seen from FIGS. 7 and 8 that the successive predetermined rotational intervals of abutment member 20 are less than the circumferential spacing of either the first plurality of means (ribs 40) or the second plurality of means (indentations 18). Of course, since the abutment member 20 is formed from an elastomeric material, the engagement of the ribs and indentations afford rotation of the abutment member while releasably locking the abutment member against rotation at predetermined rotational intervals. As a result, when the abutment member is properly adjusted, inadvertent rotation of the abutment member 20 within the aperture 12 is precluded notwithstanding repeated closures of the hood.

As will also be noted in FIGS. 7 and 8, because the abutment member 20 is formed from an elastomeric material and can be cored out, if desired, three forms of deflection of the abutment member 20 take place within the aperture 12. Firstly, the pressure on the ribs 40 lying on the workpiece surface outside of the indentations 18 causes a tensile situation to exist to in turn cause the shank portion to elongate. Also, as can be noted in FIG. 7, the threads within the aperture 12 will also deform. Secondly, when the hood is brought down on to the raised spherical surface portion 26 of the abutment member 20, a compressive force will be provided to form a resilient compressive force. Lastly, if the aperture 12 is undersized, the shank portion 25 of the abutment member 20 will be compressed radially inwardly. All of these forces aid in the retention of the abutment member 20 in its releasably locked position within the aperture 12.

In addition to the foregoing, added resistance to rotation is provided by the fact that the framework of an automobile engine compartment is usually freshly painted and thus, the aperture 12 will have fresh paint about its periphery. Hence, the ribs 40, which are not engaged within one of the indentations 18, will be firmly imbedded into fresh paint forming indentations therein. This adds further resistance to rotation of the abutment member 20.

Figure 10:
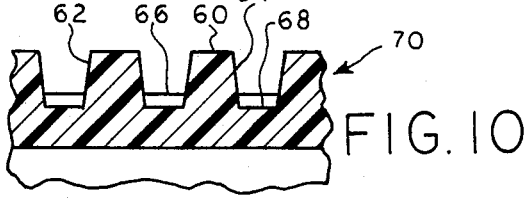
FIG. 10 is a partial cross-sectional view of an abutment member thread constructed in accordance with the second embodiment of the present invention.
Figure 9:
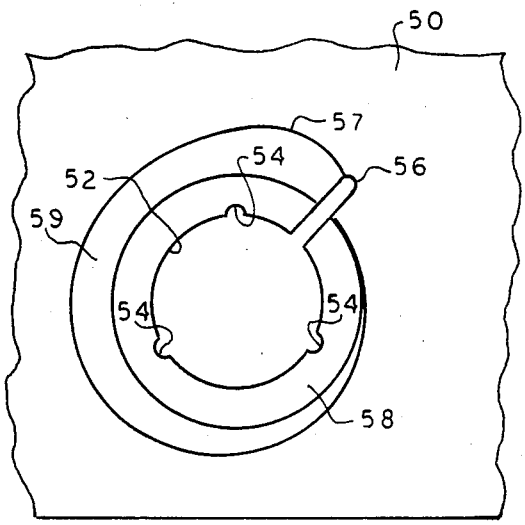
FIG. 9 is a top plan view of a workpiece having an aperture formed therein in accordance with a second embodiment of the present invention.
Figure 11:
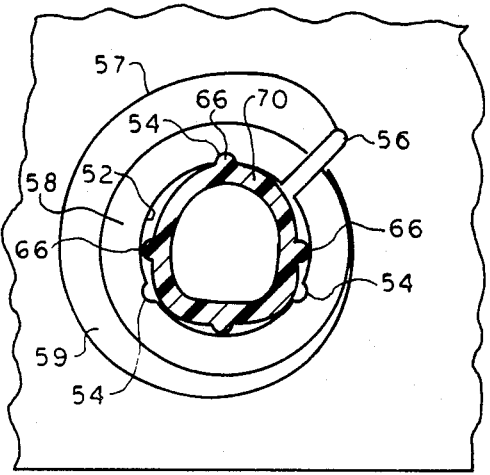
FIG. 11 is a cross-sectional view illustrating the operation of the hood bumper assembly in accordance with the second embodiment of the present invention.

Referring now to FIGS. 9-11, they collectively illustrate a second embodiment of the present invention. In FIG. 9, a workpiece 50 is illustrated having an aperture 52 formed therein which aperture 52 includes a plurality of notches 54 which extend radially outwardly from the periphery of the aperture 52. Again, a radial notch 56 is also provided to permit the workpiece 50 to be deformed about the aperture 52 to once again form a depression having a helical internal marginal portion 58 defining a single turn helical thread and a juncture line 57 between the sidewall 59 of the depression and the top surface of the workpiece 50.

In FIG. 10, the thread 60 of an abutment member 70 to be received by the aperture 52 includes a plurality of leading flanks 62 and a plurality of trailing flanks 64. Between the respectively facing leading and trailing flanks 62 and 64 there is provided a plurality of ribs or protuberances 66 extending from the root 68 of the thread 60. Again, as in the first embodiment of FIGS. 1-8, the number of ribs 66 for each turn of the helical thread 60 is unequal to the number of notches 54 provided in the aperture 52.

When the abutment member 70 of FIG. 10 is threadingly received within the aperture 52, it will take a cross section as illustrated in FIG. 11. As can be clearly seen in FIG. 11, one of the ribs 66 is in engagement with one of the notches 54 to releasably lock the abutment member 70 against rotation. Also, because the other ribs 66 are not within the other notches 54, the abutment member 70 will radially deform as illustrated to add additional resistance to rotation of the abutment member 70. Of course, as with the first embodiment, because the abutment member is formed from an elastomeric material, it may be rotated within the aperture 52 from one releasably locked position to the next until the abutment member is properly adjusted. Thereafter, the abutment member will remain in adjustment and not be inadvertently rotated within the aperture 52 during repeated closures of the automobile hood.

The assembly of the present invention is particularly suited for use in an automobile or the like having a stamped recess in the underside of the hood in alignment with the spherical surface 26. Such a recess is preferably configured to define a generally spherical upper surface in general correspondence to the contour of the spherical surface portion 26 of the head 22. In such a case, the spherical surface 26 upon engaging the corresponding surface of the hood will prevent lateral vibration of the hood and provide repeated lateral placement or positioning of the hood upon each closure thereof.

Figure 12:
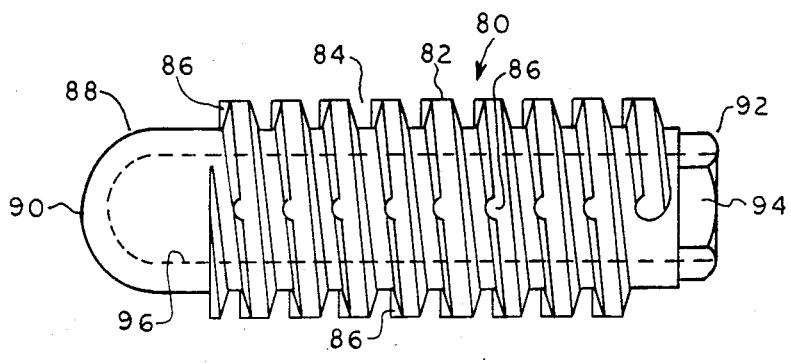
FIG. 12 is a side plan view of another abutment member constructed in accordance with a further embodiment of the present invention.

FIG. 12 shows another abutment member 80 in accordance with a further embodiment of the present invention. The member 80 has a thread 82 on a shank portion 84 which is identical to the thread configuration of FIGS. 4, 5, and 7. Again a plurality of ribs 86 are provided as previously described. However, the thread and ribs could just as well take the form as illustrated in FIGS. 10 and 11 without departing from this embodiment of the present invention.

In contrast to the abutment members previously described, the member 80 is arranged to be threaded upwardly into an aperture from the bottom surface of the workpiece. To that end, a nose portion 88 is provided to lead and direct the thread 82 into threading engagement with the aperture. As will be appreciated, the aperture and helical formation of FIG. 1 may be utilized for this purpose with the exception that the impression forming the aperture and helical thread may be struck from the back or bottom surface of the workpiece.

Also in this embodiment, the nose portion 88 not only serves to guide the member 80 into its aperture, but further serves as the end which engages the hood. As can be noted in the figure, nose portion 88 has a generally spherical end surface 90 to provide lateral positioning and stability of the hood as previously described. The end of the member opposite the nose portion 88 is provided with a driving formation 92 in the form of a hex 94. This permits driving of the member 80 into its aperture.

The member 80 as illustrated includes a blind bore 96. However, the member 80 may be solid as well.

From the foregoing, it can be appreciated that the present invention provides a new and improved adjustable abutment assembly and more particularly a new and improved adjustable hood bumper assembly. By virtue of the ribs carried by the abutment member shank portions and the indentations or notches formed within or about the workpiece apertures, the abutment member of an assembly constructed in accordance with the present invention will be releasably locked against rotation within its aperture at predetermined rotational intervals to preclude inadvertent rotation of the abutment member. Additionally, because the number of ribs for each turn of the helical thread is unequal to the number of notches or indentations formed within or about the workpiece aperture, the shank portion of the abutment member will be deformed as described to create further resistance to abutment member rotation. Also, because the end of the abutment member which engages the hood has a generally spherical surface portion, lateral vibration of the hood is prevented and repeated lateral positioning of the hood is provided upon each closure thereof. As a result, the present invention provides a new and improved adjustable abutment assembly and more particularly a new and improved hood bumper assembly which is readily adjustable and which will remain in adjustment.

While particular embodiments of the present invention have been shown and described, modifications may be made, and it is therefore intended to cover in the appended claims all such changes and modifications which fall within the true spirit and scope of the invention.

The invention is claimed as follows:

1. An assembly comprising: a workpiece having an aperture, said workpiece including a substantially helical internal marginal portion defined around said aperture adapted to accept a member with helical threads thereon; an integrally formed member of a resilient material having a shank means and a head portion, said shank means including a helical thread adapted to be threadingly received by said helical internal marginal portion around said aperture, said head portion including a surface portion; cooperating means carried by said shank means and said workpiece for resisting relative rotation between said member and said workpiece at predetermined rotational intervals, said cooperating means including a first plurality of means on said shank means at predetermined circumferentially spaced intervals and a second plurality of means on said workpiece at predetermined circumferentially spaced intervals, said first and second circumferentially spaced intervals being unequal; whereby said predetermined rotational intervals of said member relative to said workpiece are determined by registry of at least one of said first plurality of means with at least one of said second plurality of means, wherein the angular spacing between successive rotational intervals of said member is less than the circumferential spacing of either of said first and second circumferentially spaced intervals.

2. An assembly as defined in claim 1, wherein said first plurality of means of said cooperating means comprises a plurality of ribs carried by said shank means and said second plurality of means comprises a plurality of indentations within said workpiece about said aperture and wherein at least one of said ribs is arranged to releasably lockingly engage at least one of said indentations at each of a predetermined number of rotative positions.

3. An aassembly as defined in claim 2, wherein the number of said ribs for each turn of said shank means helical thread is unequal in number to the number of said indentations for each turn of said helical internal marginal portion around said workpiece aperture.

4. An assembly as defined in claim 3, wherein said helical internal marginal portion comprises a single turn thread.

5. An assembly as defined in claim 3, wherein said shank means thread includes a plurality of flanks and wherein said ribs are on said flanks.

6. An assembly as defined in claim 5, wherein said indentations are formed within the surface of said workpiece adjacent to said aperture which makes surface contact with said flanks.

7. An assembly as defined in claim 6, wherein said shank means thread includes a plurality of roots, wherein said ribs extend radially from said roots on said flanks, and wherein said indentations extend radially from said aperture.

8. An assembly as defined in claim 3, wherein said shank means thread includes a plurality of roots and wherein said ribs are on and radially extend from said roots.

9. An assembly as defined in claim 7, wherein said indentations are formed within said helical internal marginal portion defined around said aperture.

10. A hood bumper assembly comprising: a workpiece including an aperture and a substantially helical internal marginal portion defined around said aperture; an integrally formed member having a head portion arranged to engage the hood when closed and a shank portion extending from said head portion, said shank portion including a helical thread for being threadingly received by said helical internal marginal portion around said aperture; and detent means including a first plurality of means at predetermined circumferentially spaced intervals carried by said shank portion and a second plurality of means at predetermined circumferentially spaced intervals carried by said workpiece, said first and second circumferentially spaced intervals being unequal, at least one of said first plurality of means adapted to cooperate with at least one of said second plurality of means for releasably locking said shank at rotatively spaced positions with respect to said aperture, wherein said member is substantially precluded from rotation at predetermined rotatively spaced positions of said shank portion by said detent means, said rotatively spaced positions determined by registry of at least one of said first plurality of means with at least one of said second plurality of means, wherein the angular spacing between successive rotatively spaced positions of said member is less than the circumferential spacing of either of said first and second circumferentially spaced intervals.

11. An assembly as defined in claim 10, wherein said hood is of the type having a stamped recess in the underside thereof and wherein said head portion includes a generally spherical surface for engaging said recess to prevent lateral vibration of the hood.

12. An assembly as defined in claim 10, wherein said helical thread on said shank portion includes a root and a plurality of flanks extending from said root, said first plurality of means of said detent means comprises a plurality of ribs carried by said flanks and extending radially outwardly from said root, and wherein said second plurality of means comprises a plurality of indentations formed on the surface of said workpiece adjacent to said aperture.

13. An assembly as defined in claim 12, wherein the number of said ribs carried by said flanks for each complete turn of said helical thread is unequal to the number of said indentations.

14. An assembly as defined in claim 10, wherein said helical thread on said shank portion includes a root, said helical thread includes a plurality of flanks extending from said root, said first plurality of means of said detent means comprises a plurality of ribs extending from said root between said flanks and said second plurality comprises a plurality of notches within said helical internal marginal portion around said aperture.

15. An assembly as defined in claim 14, wherein the number of said ribs carried by said roots for each complete turn of said helical thread is unequal to the number of said notches.

16. An assembly as defined in claim 10, wherein said head portion comprises a hexagonal head having a raised generally spherical surface portion.

17. A hood bumper member for assembly with an apertured workpiece having a substantially helical marginal portion defining the aperture, a first plurality of abutment means at circumferentially spaced intervals on said helical marginal portion, said member having a first portion for engaging a hood or the like and a shank portion extending from said first portion adapted to be received through said aperture, said shank portion including a helical thread for threadingly engaging the helical marginal portion around the aperture in the workpiece when the member is assembled with the workpiece, said shank portion incuding a second plurality of abutment means at circumferentially spaced intervals engageable with said first plurality of abutment means on said helical marginal portion for releasably locking said member against rotation with respect to a workpiece, the circumferentially spaced intervals of said first plurality of abutment means being unequal to the circumferentially spaced intervals of said second plurality of abutment means, wherein the angular spacing between successive locking positions of said member are circumferentially spaced a distance less than the circumferentially spaced intervals of either the first or second plurality of abutment means.

18. A member as defined in claim 17, wherein said second plurality of abutment means on said shank portion comprises a plurality of discrete detent means on said helical thread of the shank portion.

19. A member as defined in claim 17, wherein said second plurality of abutment means on said shank portion comprises a plurality of discrete detent means located on a root portion of said the helical thread on shank portion.

20. A member as defined in claim 17, wherein said first portion includes a generally spherical surface for engaging the hood.

* * * * *